United States Patent Office 3,618,313
Patented Nov. 9, 1971

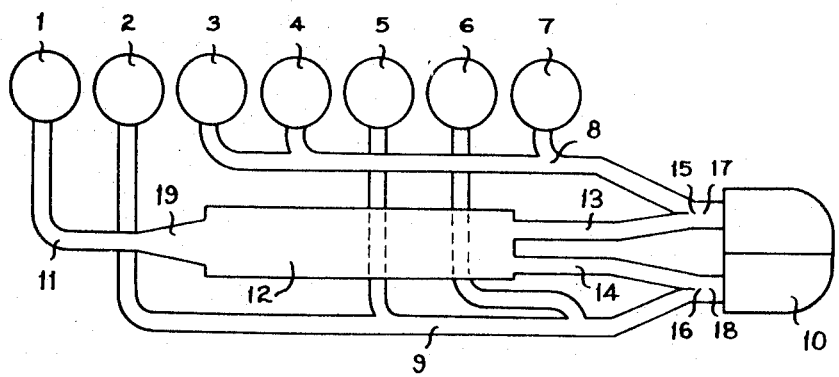
INVENTOR.
Gottlieb Zehnder

3,618,313
METHOD OF AND APPARATUS FOR SUPERCHARGING AN INTERNAL COMBUSTION ENGINE
Gottlieb Zehnder, Kirchdorf, Switzerland, assignor to Aktiengesellschaft Brown, Boveri & Cie, Baden, Switzerland
Filed Aug. 21, 1969, Ser. No. 851,939
Claims priority, application Switzerland, Sept. 11, 1968, 13,853/68
Int. Cl. F02b 37/00
U.S. Cl. 60—13                                      4 Claims

ABSTRACT OF THE DISCLOSURE

A method of supercharging a multi-cylinder internal combustion engine wherein the exhaust gases from the cylinders supply the inlet to the supercharger partly in pulsed operation and partly in constant-pressure operation.

A receiver is located between one cylinder and the supercharger, the remaining cylinders are combined in at least two groups of at least two cylinders each, the exhaust gases from each group flow via an exhaust pipe to a junction with a gas outlet pipe from the receiver, and they then pass through a mixer tube to one inlet of the supercharger.

---

The present invention relates to an improved method for supercharging an internal-combustion engine having a plurality of cylinders whereof the exhaust gases supply the inlets of at least one supercharger, and to a new device for carrying out this method.

For supercharging internal-combustion engines, there are known methods which work either with substantially constant pressure or with a pressure which undergoes sharp temporal variations ahead of the supercharger, and are accordingly known as constant-pressure or pulsed operation respectively. For constant-pressure operation, a large-volume receiver, from which the exhaust gases are fed at constant pressure to the supercharger, is arranged between the engine and the supercharger. In the case of an exhaust-gas turbo-charger, the turbine can, as a result, be fully supplied, and may be so designed that it always runs in the region of optimum efficiency. The disadvantage of this method resides in that the kinetic energy of the exhaust gases is subjected to turbulence upon entering the receiver, and is therefore partly lost.

In pulsed operation, the exhaust gases of the engine are fed via the shortest possible pipes to the supercharger, with the result that the latter acquires more energy than in the case of constant-pressure operation. However, the exhaust pipes of a plurality of cylinders can then work only onto a common inlet to the supercharger if the exhaust pulsation of one cylinder is not to interfere with scavenging of another cylinder. For this reason, a plurality of independent inlets are used on the supercharger in the case of some members of cylinders, and the number of inlets required increases as the number of cylinders becomes less favorable as regards supercharging. This results in fan-losses in the supercharger, which is then supplied for only part of the time, and efficiency is reduced.

There are supercharging methods which are known by the name of "two-stage supercharging," and which use both constant-pressure and pulsed operation in the same installation, but in this case two mutually independent superchargers are always required for the two processes, and in addition each machine exhibits the above disadvantages.

The present invention is based on the problem of attaining temporarily complete supply at the gas-inlet of the supercharger even in the case of internal-combustion engines with a number of cylinders which is technically unfavorable to supercharging, it being intended at the same time to preserve the advantages of pulsed operation as regards good use of energy. According to the invention, this problem is solved by virtue of the fact that the exhaust gases are supplied to the supercharger partly in pulsed operation and partly in constant-pressure-like operation.

A novel device for carrying out this method is distinguished by the fact that a receiver receives the exhaust gases from at least one cylinder, and the remaining cylinders are combined in at least two groups of at least two cylinders each, the exhaust gases of each group flowing via at least one exhaust pipe to a junction with a gas-outlet pipe from the receiver, and then passing through a mixer tube to one inlet of the supercharger.

The invention will be more precisely explained with the aid of the accompanying drawing and with reference to the example illustrated thereon in the form a 7-cylinder 4-stroke diesel engine. The engine cylinders are designated by 1 to 7, and the cylinders 2, 5, 6 and 3, 4, 7 are, in each case combined into a single group with a common exhaust pipe 8 and 9 respectively. From the firing order of 1–2–4–6–7–5–3 with a regular firing interval of $720:7 = 102\tfrac{6}{7}$ degrees of crank-angle, it may be seen that exhaust pulsations follow one another in the exhaust pipes 8 and 9 twice at an interval of $205\tfrac{5}{7}$ degrees of crank-angle and once at an interval of $308\tfrac{4}{7}$ degrees of crank-angle. Regard being had to the transit time of the pressure-wave generated by initial exhaust from the cylinders, the short firing interval of $205\tfrac{5}{7}$ degrees of crank-angle is sufficient for scavenging, while the long firing interval of $308\tfrac{4}{7}$ degrees of crank-angle would involve a sharp drop in pressure at the gas-inlet to the supercharger 10.

In order to avoid this, the exhaust gases from cylinder 1 are passed through the exhaust pipe 11 into the receiver 12, where the exhaust pulsations are at least partly equalized. The gas-outlet pipes 13 and 14 from the receiver 12 are joined to the exhaust pipes 8 and 9 at the junction points designated by 15 and 16, whereupon the exhaust gases then pass through the mixer tubes 17 and 18 to the inlets of the supercharger 10. During the longer firing interval in the two groups of cylinders, the supercharger is now supplied with exhaust gases from the receiver in constant-pressure-like operation, while when pressure-pulsations or increased pressure occur in the exhaust pipes 8 and 9, little or no exhaust gas passes from the receiver into the mixer tubes 17 and 18 and to the supercharger. This eliminates large reductions in pressures at the inlet of the supercharger, which receives a compensated supply and becomes more efficient.

Since the exhaust port of cylinder 1 opens only $102\tfrac{6}{7}$ degrees of crank-angle after that of cylinder 3 when the firing order is as stated, the gas-interchange of cylinder 3 would be severely upset if the initial exhaust wave of cylinder 1 were not damped. In order to achieve this, the exhaust pipe 11 is led into the receiver 12, a diffuser 19 being expediently interposed at the entrance to the receiver.

It is advantageous for both the exhaust pipes 8 and 9 and the gas-outlet pipes 13 and 14 to be constricted after the manner of a nozzle at the junctions 15 and 16. Such nozzles in the exhaust pipes accelerate the gas-flow as it emerges, and reduce the amount of exhaust gases flowing away into the gas-outlet pipes 13 and 14 and further into the receiver 12. Use may be made of the nozzles at the end of the gas-outlet pipes 13 and 14 in order to regulate the flow-resistance to exhaust gases from cylinder 1. The exhaust pulsations of cylinders 2 to 7 also cause a low-amplitude pressure-wave to pass continuously into the receiver 12, with the result that reflected waves from the supercharger back to the cylinders are reduced.

According to another embodiment of the invention, valves (not illustrated) are incorporated in the gas-outlet pipes 13 and 14, and their opening is so regulated that exhaust gases from the receiver 12 are supplied to the supercharger only at a definite time in the firing order for a definite period. This eliminates interaction between cylinder 1 and the two groups of cylinders.

The device described may be used in various constructional forms. Thus for example an exhaust-gas turbocharger or an aerodynamic pressure-wave machine may be used, and furthermore there may be more than one supercharger for one engine, or the exhaust gases from a plurality of cylinders may be received by the receiver. The receiver need not be a separate container as such, but a corresponding increase in cross-section in the exhaust pipe 11 may also comply with requirements. Neither is it necessary for a gas-outlet pipe from the receiver to go to each exhaust pipe from a group of cylinders. The number of groups of cylinders will be chosen in each case in the light of expediency, and it is left to the technician whether he wishes to combine the exhaust gases from the cylinders of a group in a common pipe or take each individual exhaust pipes separately to the junction with the gas-outlet pipe from the receiver.

The invention enables a full supply to be fed to the supercharger without the scavenging phases of the cylinders of the internal-combustion engine being upset in a manner which could not be permitted. This improves the efficiency of the engine.

I claim:

1. Apparatus for supercharging an internal combustion engine having a plurality of cylinders with at least one supercharger having a plurality of inlets, the exhaust gases from said engine supplying the inlets of said supercharger, comprising a receiver for receiving and reducing pulsations of the exhaust gases from at least one of said cylinders, a gas outlet pipe from said receiver, at least one exhaust pipe for transmitting the exhaust gases from the remaining cylinders, said remaining cylinders being combined into at least two groups of at least two cylinders each, a junction for combining the gases from said gas outlet pipe with the gases from said exhaust pipe, a mixer tube connected to said junction and leading to one of said inlets of the supercharger, whereby the exhaust gases are supplied to the supercharger partly in pulsed operation and partly in constant-pressure like operation.

2. A method of supercharging an internal combustion engine having a plurality of cylinders by at least one supercharger having a plurality of inlets, the exhaust gases from said engine supplying the inlets of the supercharger, comprising passing the exhaust gases from at least one of said cylinders into an expanded zone in which the pressure pulsations are at least partially reduced, passing the pulsating exhaust gases from the remaining cylinders in at least two separate streams from at least two cylinders each to the supercharger, combining the gases having at least partially reduced pressure pulsations with the pulsating gases of the separate streams only when the pressure of the pulsating gases is below the maximum pressure of the separate streams whereby the pulsations of the combined gases passed to the supercharger are less than the pulsations of the exhaust gases in the separate streams.

3. Apparatus as claimed in claim 1 characterized in that at least one of the gas outlet pipes from the receiver and the exhaust pipe from one group of cylinders is constricted after the manner of nozzles at the junction.

4. Apparatus as claimed in claim 1 characterized in that an exhaust pipe from said one cylinder to the receiver merges into a diffusor before entering the receiver.

References Cited

UNITED STATES PATENTS

| | | | |
|---|---|---|---|
| 1,895,538 | 1/1933 | Buchi | 60—13 |
| 3,064,417 | 11/1962 | Tryhorn | 60—13 |
| 3,221,492 | 12/1965 | Carletti | 60—13 |

FOREIGN PATENTS

| | | | |
|---|---|---|---|
| 780,621 | 8/1957 | Great Britain | 60—13 |
| 815,787 | 7/1959 | Great Britain | 60—13 |
| 1,004,861 | 3/1957 | Germany | 60—13 |
| 1,240,181 | 7/1960 | France | 60—13 |

DOUGLAS HART, Primary Examiner

U.S. Cl. X.R.

123—119 C